United States Patent
Danielsson Fan et al.

(10) Patent No.: US 10,313,693 B2
(45) Date of Patent: Jun. 4, 2019

(54) METHOD AND APPARATUS FOR CONTROLLING A DEGREE OF COMPRESSION OF A DIGITAL IMAGE

(71) Applicant: Axis AB, Lund (SE)

(72) Inventors: Xing Danielsson Fan, Lund (SE); Niclas Danielsson, Lund (SE)

(73) Assignee: AXIS AB, Lund (SE)

( * ) Notice: Subject to any disclaimer, the term of this patent is extended or adjusted under 35 U.S.C. 154(b) by 235 days.

(21) Appl. No.: 15/344,079

(22) Filed: Nov. 4, 2016

(65) Prior Publication Data

US 2017/0134739 A1  May 11, 2017

(30) Foreign Application Priority Data

Nov. 5, 2015 (EP) ...................... 15193151

(51) Int. Cl.
| | |
|---|---|
| H04N 19/426 | (2014.01) |
| H04N 19/597 | (2014.01) |
| H04N 19/139 | (2014.01) |
| H04N 19/137 | (2014.01) |
| H04N 19/136 | (2014.01) |
| H04N 19/176 | (2014.01) |
| H04N 19/182 | (2014.01) |
| H04N 13/161 | (2018.01) |
| G06K 9/52 | (2006.01) |
| G06K 9/62 | (2006.01) |

(52) U.S. Cl.
CPC ............ *H04N 19/426* (2014.11); *G06K 9/52* (2013.01); *G06K 9/6201* (2013.01); *H04N 13/161* (2018.05); *H04N 19/136* (2014.11); *H04N 19/137* (2014.11); *H04N 19/139* (2014.11); *H04N 19/176* (2014.11); *H04N 19/182* (2014.11); *H04N 19/597* (2014.11)

(58) Field of Classification Search
None
See application file for complete search history.

(56) References Cited

U.S. PATENT DOCUMENTS

| | | |
|---|---|---|
| 5,768,404 A | 6/1998 | Morimura et al. |
| 2010/0002073 A1 | 1/2010 | Robinson et al. |
| 2011/0188740 A1* | 8/2011 | Lim ........................ G06K 9/00 382/154 |
| 2013/0147843 A1 | 6/2013 | Shimizu |

FOREIGN PATENT DOCUMENTS

| | | |
|---|---|---|
| EP | 2706504 A2 | 3/2014 |
| JP | 2007-067469 A | 3/2007 |

OTHER PUBLICATIONS

EP 15 19 3151 Extended European Search Report (dated Jan. 11, 2016).

(Continued)

*Primary Examiner* — Janese Duley
(74) *Attorney, Agent, or Firm* — Volpe and Koenig, P.C.

(57) ABSTRACT

Described is a method and apparatus for controlling a degree of compression of a digital image, and more specifically to such method and apparatus which receives a stereoscopic digital image, and controls a degree of compression of the digital image based on block matching characteristics between the two images of the stereoscopic digital image.

28 Claims, 5 Drawing Sheets

(56) References Cited

OTHER PUBLICATIONS

Ortega et al. "Stereo Image Compression with Disparity Compensation using the MRF Model" (Mar. 17, 1996).
Pei-Jun Lee et al. "Vision Perceptual Based Rate Control Algorithm for Multi-View Video Coding" (Jun. 8, 2011).
European Office Action dated Jun. 14, 2016.
European Office Action dated Sep. 12, 2016.
Hu et al., "A Quantitative Evaluation of Confidence Measures for Stereo Vision," in IEEE Transactions on Pattern Analysis and Machine Intelligence, vol. 34, No. 11, pp. 2121-2133, (Nov. 2012).
European Office Action dated Jul. 2, 2018 for the European Patent Application No. 17206720.9.

\* cited by examiner

METHOD AND APPARATUS FOR CONTROLLING A DEGREE OF COMPRESSION OF A DIGITAL IMAGE

FIELD OF INVENTION

The present invention relates generally to a method and apparatus for controlling a degree of compression of a digital image.

BACKGROUND

Within image processing there is a continuing effort put into reducing bit rate or image size while maintaining a perceived quality of an image. Typically, for monitoring purposes, when encoding the image, an object having motion may in many cases be prioritized in some way in relation to a static object, e.g. parts of the image comprising a walking human will be allocated a higher bit rate (lower degree of compression) than parts of the image comprising the pavement which the human walks on. In many cases, this is an advantageous way of encoding the image, but in some cases it may result in that parts of the image comprising uninteresting but moving objects such as moving leaves of a tree will be encoded with a lower degree of compression, and thus consume unnecessary bit rate (for no use). Also noise in the image may be identified, wrongly, as motion and consume bitrate. A poor image quality due to e.g. darkness, rain, snow, or fog may also give similar problems.

There is thus a need for improvements within this context.

SUMMARY

In view of the above, an objective of the invention is to solve or at least reduce one or several of the drawbacks discussed above. Generally, the above objective is achieved by the attached independent patent claims.

According to a first aspect, the present invention is realized by a method of controlling a degree of compression of a digital image representing a scene, said method comprising: receiving a first digital image and a second digital image representing a first and second view of the scene, respectively, determining pairs of matching pixels between the first and second digital images by applying a block matching algorithm on the first and second digital images, calculating confidence metrics, each confidence metric defining a matching confidence of a pair of matching pixels among the pairs of matching pixels, setting the digital image representing the scene, and encoding the digital image representing the scene by controlling a degree of compression of the digital image representing the scene based on the confidence metrics.

By the term "controlling a degree of compression of the digital image representing the scene based on the confidence metrics" should, in the context of present specification, be understood that for at least one portion of the digital image, the confidence metric will determine, or contribute to determining, the compression ratio of the at least one portion of the digital image. It should be noted that the confidence metric may just be one of several inputs to an encoding algorithm for determining the compression ratio of the at least one portion of the digital image. However, the confidence metric will at least contribute to determining the compression ratio of the at least one portion of the digital image. It should also be noted that according to some embodiments, the degree of compression of the entire digital image will be the same. According to other embodiments, different portions of the digital image will be encoded with different degrees of compression. The degree of compression may be controlled by setting a compression ratio for a certain portion (region, area, etc.) of the image. The compression ratio may be embodied by a quantization parameter value, QP-value, ranging from e.g. 0-51 (H.264), 1-255 (VP 9), or 1-100. It should be noted that in this description, the terms "degree of compression", "compression ratio" and "compression level" are used interchangeably, in a broad sense, to denote encoding of pixels using fewer bits than the original, uncompressed, representation of the pixel.

By the term "setting the digital image representing the scene" should, in the context of present specification, be understood that the digital image to be compressed based on the calculated confidence metrics is determined. This may be realized by a preset parameter, e.g. always use the first digital image. This may also be realized by determining the digital image representing the scene on a case by case basis, e.g. use the digital image with a best contrast value among the first and second digital image. The setting of the digital image representing the scene could also be a combination of the first and the second image, e.g. in the form of a stereo image.

The inventors have realized that two images of the same scene which are captured from different angles, i.e. since the cameras are shifted in position, may advantageously be used for analyzing content of the images. By employing a suitable block matching algorithm, a certainty of matches between blocks of pixels between the two images can be used for determining well defined, detailed objects, with texture within the images and also for determining noisy portions of the image. In other words, detailed non-repetitively textured regions of the first and second digital image will likely be well matched (higher matching confidence) while other regions may not be well matched (lower matching confidence).

The block matching algorithm may for example be an algorithm for calculating a depth map of the scene. The block matching algorithm may comprise computing a sum of absolute differences between a template block of pixels, e.g. in one of the first and the second digital image, and a block of pixels in the other of the first and the second digital image. When doing this for a plurality of blocks of pixels in the other of the first and the second digital image, a best match may be determined. Using the information of the plurality of computed sums (i.e. block matching characteristics), a confidence metric of the matching confidence of the best match may be calculated, or at least for a pair of pixels, one per block (i.e. the center pixel or similar) of the best match. It should be noted that not all pixels in the first digital image need to be matched to a pixel in the second digital image. According to some embodiments, only every other, every fourth, or even every 16th pixel, etc. in the first digital image may be matched to a pixel in the second digital image using the block matching algorithm.

With the present invention, portions of the images which do not comprise well defined, detailed objects, with texture, may result in a low matching confidence between the first and second digital images, since the block matching algorithm in those cases may return several likely matches for a certain block of pixels. For example, for a large surface with no texture, e.g. a white table, a certain block of pixels comprising a part of the table in e.g. the first image, will probably match with a plurality of blocks of pixels in the second image, i.e. blocks of pixels all showing parts of the table. Such areas may advantageously be encoded with a certain degree of compression in the digital image representing the scene, wherein the degree of compression differs from portions of the image which comprises well defined, detailed objects, with texture. It should be noted that the digital image representing the scene, which is encoded according to the above, may be one of the first digital image, the second digital image, a stereoscopic digital image comprising the first and second digital image, a composition of the first and second digital image, or any other combination of the first and second digital image.

Further, noisy parts of the images, e.g. moving leaves, drops of rain or snow falling from the sky, etc. may not be well matched between the first and second image. Such areas may also advantageously be encoded with a certain degree of compression, which differs from portions of the image which comprises well defined, detailed objects, with texture.

Depending on what content of the first and digital image that a user of this method wants to keep with a high quality in the encoded digital image representing the scene, the degree of compression is either increased or decreased for a certain confidence metric compared to another confidence metric.

The present invention may be particularly advantageous in a monitoring application with restrictions on bit rate, since for monitoring reasons, the quality of certain areas, such as areas only comprising grass, trees and/or walls, is of less importance. In prior art, e.g. a lawn may be encoded with an unnecessarily high quality e.g. due to many small details in the image regions depicting the lawn, and trees may be encoded with an unnecessarily high quality, e.g. if the leaves of the tree are in many different colors (or of the foliage of the tree is otherwise cluttered), or if it is windy. With the present invention, such problems may be reduced.

According to some embodiments, a first and a second pair of matching pixels are determined, wherein the step of calculating confidence metrics comprises calculating a first confidence metric defining a matching confidence of the first pair of matching pixels, and a second confidence metric defining a matching confidence of the second pair of matching pixels, wherein the step of the encoding of the digital image representing the scene comprises: controlling a degree of compression of a first portion of the digital image representing the scene based on the first confidence metric, and controlling a degree of compression of a second portion the digital image representing the scene based on the second confidence metric.

Consequently, at least two degrees of compression are utilized when encoding the digital image representing the scene. This means that e.g. a lawn may be encoded with one degree of compression, and a moving car may be encoded with a different degree of compression.

According to some embodiments, at least a third and a fourth pair of matching pixels are determined, wherein the step of calculating confidence metrics comprises calculating a third confidence metric defining a matching confidence of the third pair of matching pixels, and a fourth confidence metric defining a matching confidence of the fourth pair of matching pixels, wherein the step of the encoding of the digital image representing the scene comprises: controlling a degree of compression of a third portion of the digital image representing the scene based on a combination of the third and the fourth confidence metric. For example, when the third portion comprises pixels corresponding to different confidence metrics, an average, median, maximum or minimum value of these confidence metrics may be used for controlling the degree of compression for the third portion. This may lead to a more substantiated controlling of the degree of compression of the third portion, and make the method less sensitive to noise.

According to some embodiments, an extent of the third portion of the digital image is based on a connected component analysis involving positions in the first and/or second image for a pixel in each of the third and fourth pair of matching pixels.

A connected component analysis may also be called connected-component labeling, blob extraction, region labeling, blob discovery, or region extraction. By the term "connected component analysis" should, in the context of present specification, be understood an algorithm for detecting connected regions among the confidence metrics. This may thus lead to a certain degree of compression used for the detected region (e.g. the third portion), even though the confidence metrics in the detected region varies. For example, an average, median, maximum or minimum value of the connected confidence metrics may be used for controlling the degree of compression for the third portion. With this embodiment, a more efficient encoding process may be achieved, since larger areas/regions in the digital image representing the scene which will be encoded with the same degree of compression may be determined.

According to some embodiments, the step of encoding the digital image representing the scene comprises using a codec utilizing blocks pixels of the digital image, wherein each block have a shape and a size, wherein the extent of the third portion further is based on shape and size of at least one block of pixels which are comprised in the third region.

By the term "block of pixels" should, in the context of present specification, be understood the basic units of pixels of the digital image used when encoding the digital image.

The block of pixels may in some video encoding standards be called a macroblock. In the video encoding standard H.264, the size of the block of pixels may be 16*16 pixels. In the video encoding standard H.265, the size of the block of pixels may vary between 16×16 to 64×64 pixels since H.265 employs the so called coding tree units (CTUs) instead of macroblocks. Other standards (codecs etc.) and sizes of the block of pixels may be used. With this embodiment, a more efficient encoding process may be achieved since the extent of a portion in the digital image representing the scene having the same degree of compression may approximately or perfectly overlap one or more block of pixels. It should be understood that all suitable block based codecs (i.e. a codec utilizing blocks), e.g., a H.264, H.265, MPEG-4 Part 2, or VP9 codec, may be used for this embodiment.

According to some embodiments, the method further comprises the steps of: comparing a confidence metric of the confidence metrics to a predetermined threshold value, if the confidence metric is equal to or above the threshold value, the step of controlling the degree of compression comprises using a first compression ratio, if the confidence metric is below the threshold value, the step of controlling the degree of compression comprises using a second compression ratio being higher than the first compression ratio.

With this embodiment, a lower confident metric may result in a higher degree of compression for the corresponding region in the digital image representing the scene, compared to the case if the confidence metric is higher. In other words, for areas comprising well defined, detailed objects, with texture, in the first and second digital image, a high confidence match between the two images may be the result of the block matching algorithm. Such areas will thus result in a low compression ratio since they may be more interesting for a viewer of the digital image representing the scene. For areas comprising e.g. monotonic surfaces such as a lawn or noisy content such as leaves of a tree, a low confidence match between the two images may be the result of the block matching algorithm. Such areas will thus result in a higher compression ratio since they may not be that interesting for a viewer of the digital image representing the scene.

It should be noted that according to some embodiments, only two compression ratios exists, one for "bad" regions/pixels, and one for "good" regions/pixels. However, according to other embodiments, the mapping between confidence metrics and compression ratios (degree of compression) may be a continuous function. According to other embodiments, the mapping may be a discrete mapping function (as in the good/bad case) with more than two resulting compression ratios, for example when determining a QP value for a block of pixels when encoding. The QP value is usually an integer value.

According to some embodiments, the step of encoding the digital image representing the scene comprises using a codec utilizing blocks of pixels of the digital image, wherein for each block of pixels in the digital image representing the scene, the step of encoding the digital image representing the scene further comprises: controlling a degree of compression of the block of pixels by for each pixel of at least some pixels in the block of pixels, retrieving a confidence metric corresponding to the pixel, and controlling a degree of compression of the block of pixels based on the retrieved confidence metrics of the at least some of the pixels in the block of pixels.

According to this embodiment, each block of pixels in the digital image representing the scene will be considered as a region for which a degree of compression is to be determined. This may be done by considering the confidence metrics which corresponds to the pixels in a block of pixels. It is important to notice that not every pixel needs to correspond to a confidence metric; however, at least some of the pixels in the block of pixels correspond to a confidence metric. This may be advantageous in that the encoding algorithm typically wants a compression ratio as input when encoding a specific block of pixels, consequently, a simplified method for controlling the degree of compression of the digital image representing the scene may be achieved.

According to some embodiments, the controlling a degree of compression of the block of pixels comprises: comparing each retrieved confidence metric with a threshold value, counting the number of confidence metrics being equal to or above the threshold value, and controlling a degree of compression of the block of pixels based on the count.

In other words, based on the number of well-matched pixels (having a high matching confidence) in the block of pixels, the compression ratio is determined. If for example, the count is greater than or equal to X, the compression ratio is $Y_1$, and if the count is less than X, the compression ratio is $Y_2$, where $Y_2$ represents a higher compression ratio compared to $Y_1$. Similar as described above, the mapping between the count and the compression ratio may be binary, continuous or discrete.

According to some embodiments, the controlling a degree of compression of the block of pixels comprises: defining a compression ratio for the block of pixels by calculating one of: a sum, an average value, a maximum value and a median value of the retrieved confidence metrics.

According to some embodiments, the step of setting the digital image representing the scene comprises using the first digital image or the second digital image as the digital image representing the scene. In this embodiment, only one image is thus encoded based on the matching confidence between pixels of the first and the second digital image. According to other embodiments, both the first and second digital image are encoded in that the step of setting the digital image representing the scene comprises using a stereoscopic digital image comprising the first and second digital image as the digital image representing the scene.

According to some embodiments, the block matching algorithm comprises comparing a block of pixels in the first digital image to a plurality of blocks of pixels in the second digital image, and for each comparison calculating a difference value, wherein a confidence metric is calculated by counting a number of difference values that falls below a threshold difference value. The threshold difference value may be a constant value, or it may depend on the difference values, e.g. the lowest difference value. In case only one or a few difference values falls below the threshold value, it may be concluded that the lowest difference value corresponds to a pair of matching pixels with a high matching confidence since only one or a few blocks of pixels in the second digital image resulted in a difference value below the threshold. If, however, many blocks in the second digital image resulted in a similar, low, difference value, it may be concluded that the lowest difference value corresponds to a pair of matching pixels with a low matching confidence since many blocks of pixels in the second digital image resulted in a difference value below the threshold. The latter may point to that the block of pixels in the first digital image does not contain content which is well defined, with texture.

Other ways of defining a matching confidence of a pair of matching pixels may be employed, for example as described in section 3 of "A Quantitative Evaluation of Confidence Measures for Stereo Vision" by X. Hu and P. Mordohai, published in vol. 34, issue 11 of IEEE Transactions of Pattern Analysis and Machine Intelligence. For example, a curvature of a mapping between difference values and lengthwise translation distance between the block in the first digital image and the block in the second digital image may be used for calculating a confidence value. The calculation of the confidence metrics will be further described below in the detailed description.

In a second aspect, the present invention provides a computer-readable storage medium with instructions adapted to carry out the method of the first aspect when executed by a device having processing capability.

In a third aspect, the present invention provides an encoder for controlling a degree of compression of a digital image representing a scene, the encoder comprising: a receiving component arranged to receive a first digital image and a second digital image representing a first and second view of the scene, respectively. The encoder may further comprise a matching component arranged to determine pairs of matching pixels between the first and second digital images by applying a block matching algorithm on the first and second digital images. The matching component may further be arranged to calculate confidence metrics, where each confidence metric defines a matching confidence of a pair of matching pixels among the pairs of matching pixels. The encoder may further comprise an encoding component arranged to: set the digital image representing the scene, and encode the digital image representing the scene by controlling a degree of compression of the digital image representing the scene based on the confidence metrics.

According to one embodiment, the encoder may be comprised in a stereo camera arranged to capture the first digital image and the second digital image representing the first and second view of the scene The second and third aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

Figure 1:
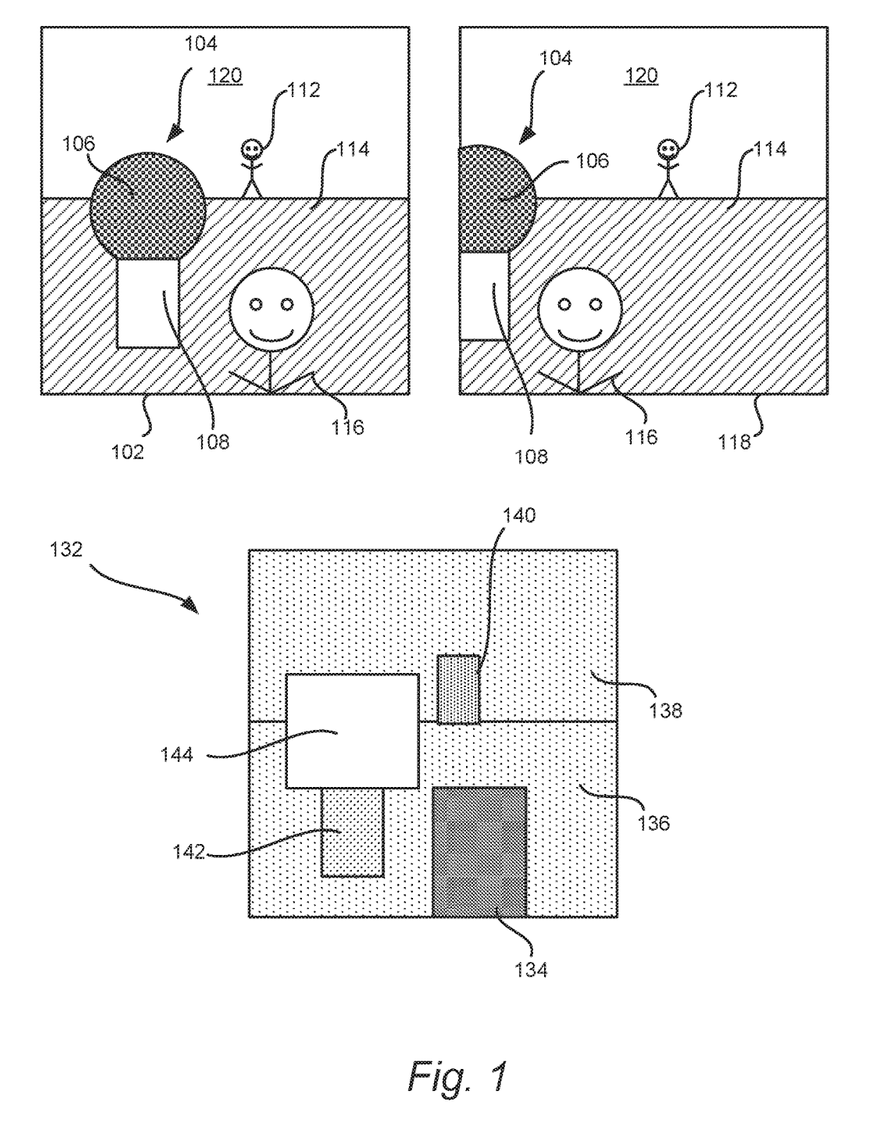
FIG. 1 shows a schematic example of how a degree of compression is controlled based two images each showing a different view of a same scene.

FIG. 1 shows by way of example two digital images 102 and 118 representing a first and second view of the scene, respectively. The first and the second digital images 102 and 118 are in this example captured by a stereo camera (not shown). The first digital image 102 is captured by a left sensor in the stereo camera, and the second digital image 118 is captured by a right sensor in the stereo camera. The scene comprises an object (e.g. a human) 116 close to the camera and an object (e.g. a human) 112 further away from the camera. The scene further comprises a tree 104 comprising a trunk 108 and foliage 106. The two humans 116 and 112 and the tree 104 stands on a lawn 114. The images 102 and 118 further show a sky 120. Due to the stereoscopy effect (or parallax effect), if an object (i.e. the human 116 and tree 104) is at close distance, the first digital image 102 and the second digital image 118 will give two noticeably different views. This is the reason why the human 116 and the tree 104 are shown at such different positions in the two images 102 and 118. The remaining object, the human 112 is also shown at different positions in the two images 102 and 118, but the difference is small due to the relatively long distance to the stereo camera. It should be noted that instead of a stereo camera, the first and the second digital images 102 and 118 may be captured by two different ordinary cameras, which are separated by some distance and directed to the same (or similar) point far away in the scene.

A stereo camera thus captures two images from slightly different positions. For most pixels in the first digital image 102, a corresponding pixel is found in the second digital image 118, and these two pixels form a pair of matching pixels, with the distance between being a disparity value. A disparity map is a collection of the disparity values of all pixels. Thus, the disparity value is related to the distance from the camera to the element in the scene depicted by a pixel, such that a large disparity value corresponds to a small distance from the camera and vice versa. In other words, the disparity corresponds to the depth of the scene.

The process of finding the pixel in image 2 which corresponds to the pixel in image 1 is called stereo matching. Simplistically, the stereo matching can be described as comparing the pixel in the first digital image 102 with all pixels in the second digital image 118, and the pixel in the second digital image 118 which has the least differences to the pixel in the first digital image 102 is the matching pixel. In other words, when the minimum value of differences is found, the matching pixel is found. However, for increasing the speed and also the correctness of such stereo matching, a block matching algorithm may be used. Such block matching algorithm is schematically described in FIG. 2. Since the slightly different positions from which first digital image 102 and the second digital image 118 are captured often only differs horizontally, according to some embodiments a block of pixels 210 and 212 in the first digital image 118 only needs to be compared with a plurality of blocks 202 and 204 of pixels in the second digital image 118 which differs in position in a horizontal direction. Since a block of pixels are used in each image 102 and 118 for each comparison, instead of just a single pixel, a better decision for determining a matching pair of pixels 206 and 208 between the first and the second digital image 102 and 118 may be achieved.

Figure 2:
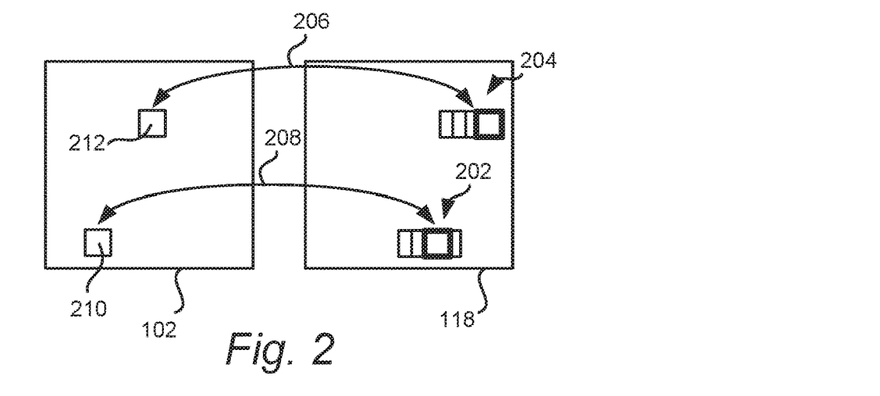
FIG. 2 shows by way of example a block matching algorithm applied to two images.

For example, for determining a matching pair of pixels 206 between the first and second digital image 102 and 118, a block of pixels 212 is compared to a plurality of blocks of pixels 204 in a similar position in the second digital image 118. In the example of FIG. 2, the block of pixels 212 is compared to four blocks of pixels 204 in the second digital image 118. The rightmost block of pixels is determined to be the best match (as shown by the bold contoured block among the plurality of block of pixels 204), and the matching pair of pixels 206 thus comprise a center pixel (or one of the centermost pixels in case the width/height of the block of pixels 212 is an even number) in the block of pixels 212 of the first digital image and a center pixel (or one of the centermost pixels in case the width/height of the block of pixels 204 is an even number) in the rightmost block of pixels among the plurality of blocks of pixels 204 in the second digital image 118.

For the second shown matching pair of pixels 208, the third block (in a left-right direction) among a plurality of blocks of pixels 202 in the second digital image 118 is determined to be the best match to a block of pixels 210 in the first digital image 102.

In other words, the block matching algorithm may comprise choosing a pixel in the first digital image 102 with coordinates (x, y). Then a corresponding pixel in the second digital image 118 is chosen with coordinates (x+d, y), where d is some integer value. Then absolute or squared intensity differences for every pixel in a neighborhood around the pixel from the first digital image 102 (at (x, y)), with respect to the corresponding pixels in a neighborhood around the pixel at (x+d, y) in the second digital image 118 are calculated. The value d is then varied with integer values in a determined search range for a comparison with the next block among the plurality of blocks 202 and 204 in the second digital image 118. The best matching block may be determined using a least-square fit algorithm. The block-matching algorithm may comprise a setting for how far away from coordinate x the search for a matching block of pixels should be performed, i.e. a max value for d.

Figure 3:
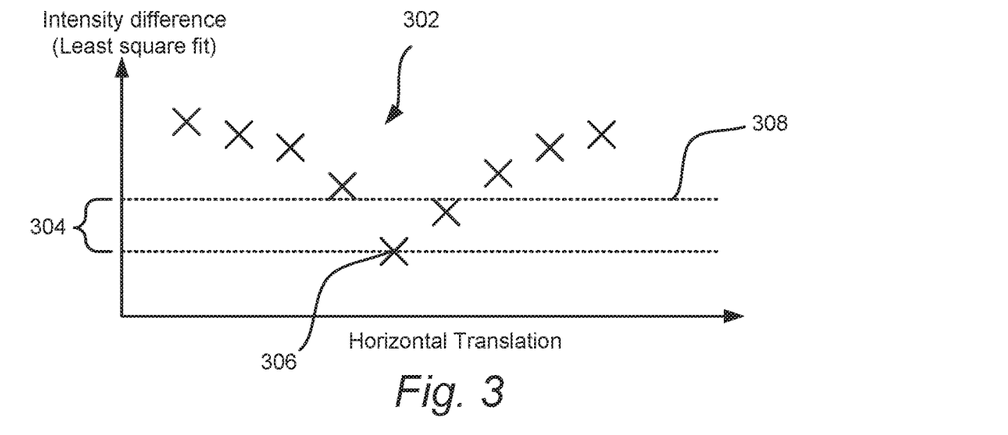
FIGS. 3-4 show by way of example outputs from a block matching algorithm.
Figure 4:
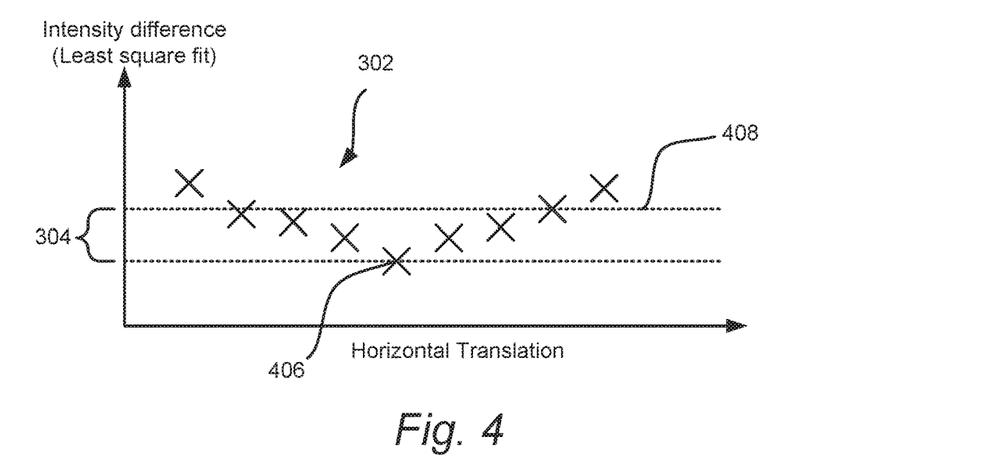

FIGS. 3-4 each show a diagram describing the intensity differences 302 (e.g. determined with least square fit) between a block of pixels in the first digital image and a plurality of blocks of pixels in the second digital image. The diagram of FIG. 3 shows a distinct best fit 306, while the diagram of FIG. 4 shows a best fit 406 which does not differs that much compared to other intensity differences in the diagram.

One possible explanation to the less distinct best fit 406 in the diagram of FIG. 4 is that the compared blocks of pixels all corresponds to regions in the images (i.e. in the first digital image and the second digital image) that lack structure or edges (e.g. flat surfaces of a single color). Another possible explanation to the less distinct best fit 406 in the diagram of FIG. 4 is that the compared blocks of pixels all correspond to regions in the images (i.e. in the first digital image and the second digital image) that comprise indistinct regions which are usually of less interest, e.g. moving leaves of a tree or areas that are dark or show rain, snow, or fog. For such areas the minimum will be smeared out and not well defined, since several blocks of pixels in the second image probably will result in a similar intensity difference 302. Also, noisy regions in the images, e.g. due to sensor characteristics of the camera and the gain amplifier of the camera, may result in a similar intensity difference 302.

The same applies if the scene content of the block of pixels in the first digital image is hidden (occluded) in the second digital image. The best fit of such a pixel (block of pixels) may not be well defined since a matching pixel might not even exist in the second digital image.

On the contrary, the diagram of FIG. 3 probably is the result of a comparison between a block of pixels in the first digital image and a plurality of blocks of pixels in the second digital image where the block of pixels in the first digital image corresponds to a region in the image that shows one or more well defined, detailed object(s), with texture. Such a comparison typically will result in a well-defined minimum (best fit 306), since a small error in location will generate a large difference in intensity 302.

Using e.g. diagrams as shown in FIGS. 3-4, a confidence metric can be calculated. The confidence metric thus defines a matching confidence of a pair of matching pixels (as shown by references 206 and 208 in FIG. 2). According to one embodiment, the difference in intensity 302, or difference value, between each of the plurality of blocks of pixels in the second digital image and the block of pixels in the first digital image are used for determining the confidence metric. For example a number of difference values that falls below a threshold difference value 308 and 408 may be used. The threshold value 308 and 408 may be calculated based on the intensity difference of the best fit 306 and 406, i.e. the threshold value may be the intensity difference of the best fit plus a value 304. The value 304 may be a predefined static value or it may be based on the value of the intensity difference of the best fit 306 and 406 (e.g. the intensity difference of the best fit 306 and 406 times a constant value). According to this embodiment, if the number of difference values 302 that falls below the threshold difference value 308 and 408 is large (as in the diagram of FIG. 4), the matching confidence of the pair of matching pixels is lower compared to if the number of difference values 302 that falls below the threshold difference value 308, 408 is fewer (as in the diagram of FIG. 3).

According to other embodiments, a curvature of the measured intensity differences 302 may be used for calculating the matching confidence of the pair of matching pixels. For example, the measured intensity differences 302 to the left of the best fit 306 and 406 may be mapped to a second degree curve, and the measured intensity differences 302 to the right of the best fit 306 and 406 may be mapped to a second degree curve. The parameters of the two second degree curves may then be used for determining the confidence metric. Other algorithms for determining a confidence metric of a pair of matching pixels are possible, as described above.

The confidence value for a matching pair of pixels may then be used for controlling a degree of compression of the digital image that is set to represent the scene. The digital image that is set to represent the scene may be one of the first and second digital images which are used for calculating the confidence metrics, it may be a stereoscopic digital image comprising the first and second digital image, or it may be any other combination of the first and second digital image (e.g. half of each).

Figure 5:
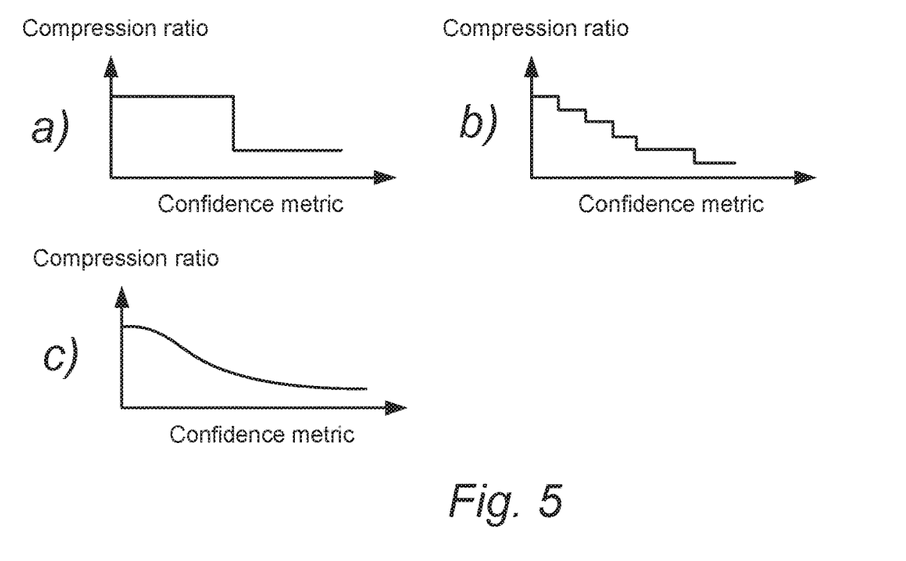
FIGS. 5a-c show by way of example three different mappings between compression ratios and confidence metrics.

FIG. 5 a-c shows three embodiments of mapping functions between a confidence metric and a compression ratio/compression level. The compression ratio may for example relate to the QP value of e.g. 11.264 and thus range from 1-51. However, the range of compression ratios depends on the used compression method/codec and all suitable ranges are possible. In the examples of FIG. 5a-c, the compression ratio is generally inversely dependent on the confidence metric. This means that a first confidence metric which has a first value corresponds to a lower (or in the FIG. 5a-b case possibly an equal) compression ratio compared to the compression ratio corresponding to a confidence metric having a lower value than the first value. For example, in FIG. 5a, if the confidence metric is equal to or above a threshold value, a first compression ratio is used, and if the confidence metric is below the threshold value, a second compression ratio is used which is higher than the first compression ratio.

As shown in FIGS. 5a-c, the mapping may be discrete (5a and 5b) or continuous (5c). In the embodiment shown in FIG. 5a, only two compression ratios are used. In this case, the resulting image representing the scene can generally be said to comprise two sorts of pixels/regions, one sort who represent a "good" pixel/region for which a lower compression ratio is used, and one sort who represent a "bad" pixel/region for which a higher compression ratio is used. In the context of FIG. 5, the good pixel/region is distinctly matched between the first and the second digital image, while a bad pixel/region is not.

The mapping can also be discrete but still comprise more than two possible compression ratios, as shown in FIG. 5b. In FIG. 5c, the mapping is continuous.

Now returning to FIG. 1. The lower part of FIG. 1 shows a representation 132 of the compression ratio used for the digital image representing the scene based on the confidence metrics of the pairs of matching pixels between the first digital image 102 and the second digital image 118. For the example of FIG. 1, the first digital image 102 is set as the digital image representing the scene. The representation 132 thus schematically describes different regions of the first digital image 102, and the compression ratios used for encoding it. In the representation 132 of FIG. 1, a darker region represents a lower degree of compression while a lighter region represents a higher degree of compression. The regions are surrounded by a black border for the ease of visualization. For example, the human 116 close to the camera, which is a well-defined, detailed object, with texture, may be easily and unambiguously matched between the first and second digital images 102 and 118. Consequently, the matching pixels between the first and second digital images 102 and 118 which represent the human have a high matching confidence.

In the example of FIG. 1, a rectangular portion 134 of the image which covers the human 116 is encoded with a same degree of compression. The extent of such a rectangular portion 134 may be the result of e.g. a connected component analysis which involves the positions of the pixels representing the human (and thus part of pairs of matching pixels having a high matching confidence). In this case, the extent of the region 134 may further be based on a size and shape of blocks of pixels (e.g. a macroblock or coding tree unit, CTU) of the digital image utilized by a codec used for encoding the digital image representing the scene, for example such that the region 134 follows edges of such blocks of pixels. The degree of compression for the region 134 may be controlled using a combination of the confidence metrics of the pixels within the region 134. In other words, for all pixels within the region 134 which correspond to confidence metrics (i.e. which are part of matching pairs of pixels as defined above), these confidence metrics are retrieved and e.g. summed, averaged etc. for controlling the degree of compression of the region 134.

Figure 6:
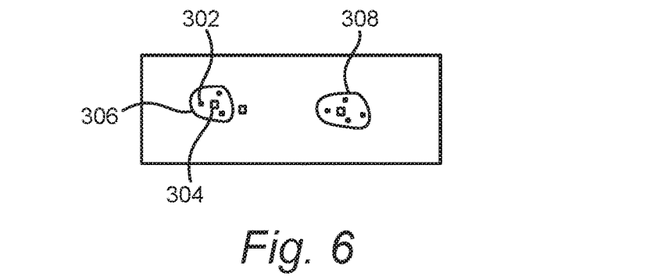
FIG. 6 shows a schematic example of the use of a connected component analysis for determining an extent of a portion of an image which is encoded using a same compression ratio.

FIG. 6 further describe the use of connected component analysis for determining an extent of a region which may be encoded using a same compression ratio. The dots 302 in the figure each represent a pixel corresponding to a first confidence metric, and the squares 304 in the figure each represent a pixel corresponding to a second, different, confidence metric. As can be seen in FIG. 6, depending on the confidence metrics and the positions of the pixels, the extent of regions 306 and 308 differs.

Now returning to FIG. 1. The representation 132 further comprises 5 regions 136, 138, 140, 142, 144, where each is encoded with a same degree of compression within one region. For example, the human 112 which is positioned further away from the camera compared to the human 116, but still is a pretty well defined, detailed object, with texture, may thus be matched between the first and the second digital images 102, 118 with a fairly high matching confidence. This results in a low degree of compression of the region 140 in the image representing the scene. However, compared to the compression rate of the region 134 corresponding to the human 116 close to the camera, the compression rate of the region 140 is higher.

The trunk 108 of the tree 104, which is a well-defined object but with not that much detail or clear texture, may still be matched with a fairly high matching confidence. However, in this case, the best fit in the block matching algorithm for a block of pixels being part of the trunk 108 in the first digital image 108 may be less distinct (as described in conjunction with FIGS. 3-4 above). Consequently, the corresponding area in the representation 132 of the compression ratio of the digital image representing the scene shows a higher compression ratio for the stem 108 compared to the compression ratio of the two humans 116 and 112.

Moreover, the lawn 114 and the sky 120 in the exemplary images 102, 118 in FIG. 1 are both uniform regions with not much details or texture. Consequently, such regions may be encoded with a high compression ratio, which is shown in the representation 132 by the lighter regions 136 and 138.

As for the foliage 106 of the tree 104, this portion of the first and second digital images 102 and 118 may comprise a lot of noise as described above. Consequently, with the approach of using confidence metrics of matching pixels between the first and second digital images 102 and 118, in order to determine the compression ratio of a region, such regions may be encoded with a high compression ratio, which is shown in the representation 132 by the white region 144.

According to some embodiments, the step of encoding the digital image representing the scene comprises using a codec utilizing blocks of pixels of the digital image. In this case, a compression ratio may be determined on a block level of the digital image representing the scene. In other words, each block of pixels may be encoded using a same degree of compression within that block of pixels. This may be achieved by for each pixel of at least some pixels in the block of pixels, retrieving a confidence metric corresponding to the pixel, and controlling a degree of compression for the block of pixels using the values of the retrieved confidence metrics. Such embodiments will now be described in conjunction with FIG. 7.

Figure 7:
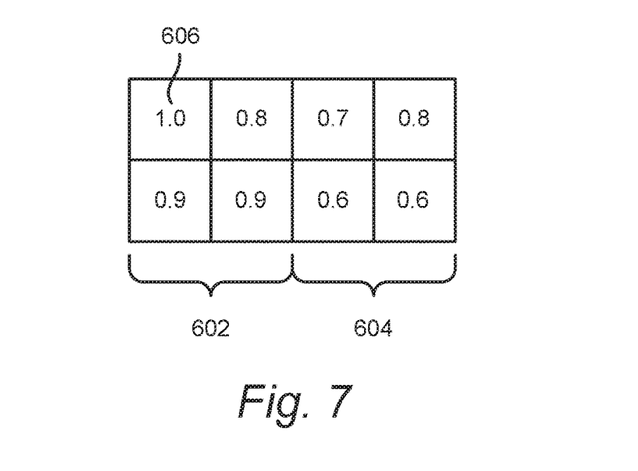
FIG. 7 shows an example of using confidence metrics for pixels within a block of pixels for determining a compression ratio for the block of pixels.

FIG. 7 shows two blocks 602 and 604 of pixels. Each block 602 and 604 of pixels comprise four pixels corresponding to confidence metrics 606. The block of pixels may further comprise pixels not corresponding to a confidence metric, as described above.

For example, the degree of compression of the block of pixels 602 and 604 may be defined by comparing each retrieved confidence metric 606 with a threshold value, counting the number of confidence metrics being equal to or above the threshold value, and controlling a degree of compression of the block of pixels based on the count. So, for example, if the threshold value in the example of FIG. 7 is 0.8, the count for the left block of pixels 602 will be 4, while the count for the right block of pixels 604 will be 1. These numbers may then be mapped to a compression ratio for the block of pixels, e.g. by using mapping schemes similar to the mapping schemes of FIG. 5, but wherein the x-axis represent the number of confidence metrics being equal to or above the threshold value. For example, the compression ratio for left block of pixels 602 may be lower compared to the compression ratio of the right block of pixels 604. Using this embodiment, the compression ratio of a block of pixels is determined based on the amount or percentage of "uniquely" matched pixels within the block of pixels, where the definition of a uniquely matched pixel is that the matching confidence of the pixel between the first and the second digital image results in a confidence metric being equal to or above the threshold value.

According to another example, the degree of compression of the block of pixels 602 and 604 may be controlled by defining a compression ratio for the block of pixels by calculating one of: a sum, an average value, a maximum value and a median value of the retrieved confidence metrics. The result of any of these calculations may then be mapped to a compression ratio for the block of pixels, e.g. by using mapping schemes similar to the mapping schemes of FIG. 5, but wherein the x-axis represent the calculated result.

Figure 8:
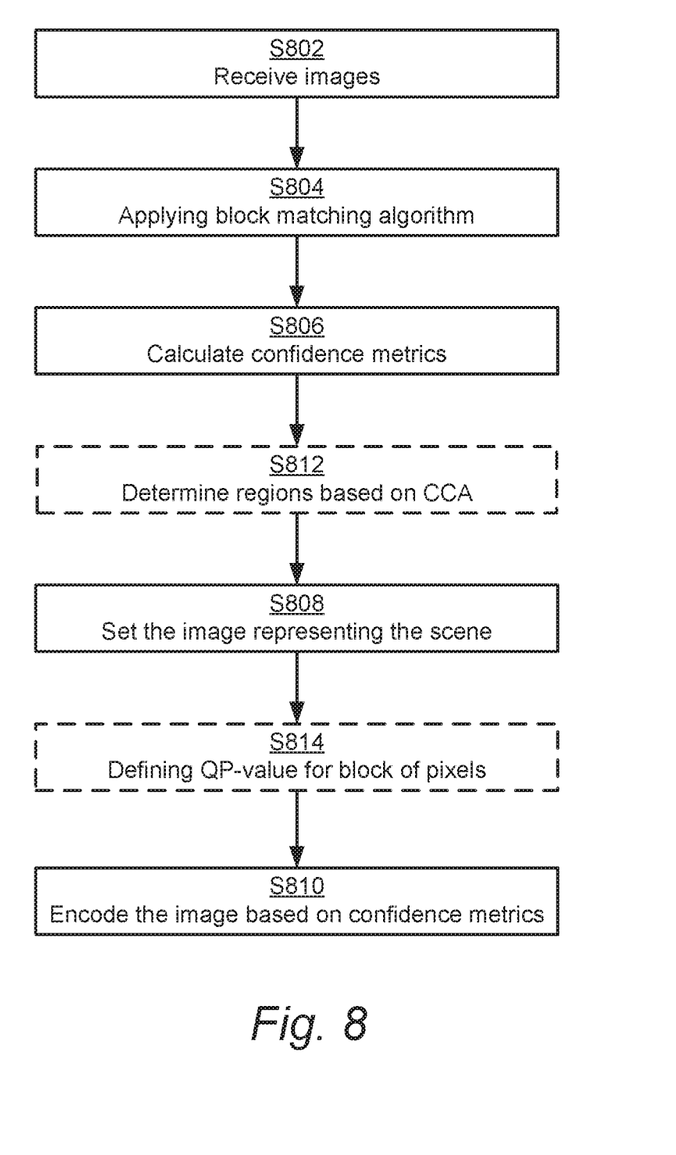
FIG. 8 shows a method of controlling a degree of compression of a digital image representing a scene according to one embodiment.
Figure 9:
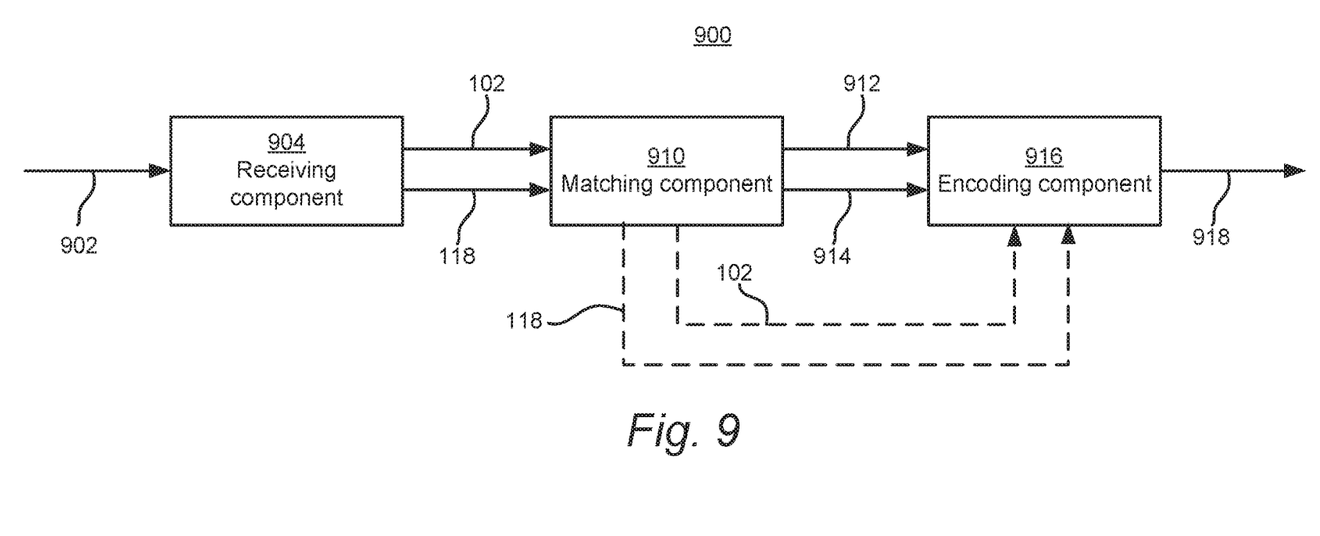
FIG. 9 shows a box diagram of an encoder according to one embodiment.

An encoder 900 for controlling a degree of compression of a digital image representing a scene will now be described in conjunction with FIGS. 8 and 9.

The encoder 900 comprises a receiving component 904 arranged to receive S802 a first digital image 102 and a second digital image 118 representing a first and second view of the scene. According to some embodiments, the first and second digital images 102 and 118 are extracted from a single bit stream 902 received by the encoder. According to other embodiments, two bit streams, each comprising one of the first and the second digital images 102 and 118, are received by the receiving component.

The encoder 900 further comprises a matching component 910 arranged to use the first and the second digital images 102 and 118 for determining pairs of matching pixels between the first and second digital images by applying S804 a block matching algorithm on the first and second digital images 102 and 118. The matching component 910 is further arranged to calculate S806 confidence metrics, each confidence metric defining a matching confidence of a pair of matching pixels among the pairs of matching pixels.

The encoder 900 further comprises an encoding component 916 which is arranged to set S808 the digital image representing the scene. For this reason, the encoding component 916 is arranged to receive (at least parts of) one or both of the first digital image 102 and the second digital image 118.

The encoding component 916 is further arranged to encode S810 the digital image representing the scene by using information 914 regarding the pairs of matching pixels and information 912 regarding the confidence metrics of the pairs of matching pixels. This is done by configuring the encoding component to control a degree of compression of the digital image representing the scene based on the confidence metrics.

The encoding component 916 is further arranged to output the encoded version 918 of the digital image representing the scene.

The encoder 900 may optionally be arranged to determine regions in the digital image based on a connected component analysis (CCA) S812 involving positions in the first and/or second digital image 102 and 118 for pairs of matching pixels and their respective corresponding confidence metric. The CCA may be performed by the matching component 910, the encoding component 916 or any other component in the encoder 900.

The encoding component 916 may optionally further be arranged to controlling S814 a degree of compression (e.g. QP value) of a block of pixels of the digital image representing the scene based on retrieved confidence metrics of the at least some of the pixels in the block of pixels.

The encoder 900 may according to some embodiments be a part of a stereo camera arranged to capture the first digital image and the second digital image representing the first and second view of the scene. According to other embodiments, the encoder 900 is separately coupled to one stereo camera or two regular cameras for receiving the first digital image and the second digital image.

The systems (e.g. encoder) and methods disclosed hereinabove may be implemented as software, firmware, hardware or a combination thereof. In a hardware implementation, the division of tasks between functional units or components referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

What is claimed is:

1. A method of controlling a degree of compression of a digital image representing a scene, said method comprising:
   receiving a first digital image and a second digital image representing a first and second view of the scene, respectively,
   determining a plurality of pairs of matching pixels between the first and second digital images by applying a block matching algorithm on the first and second digital images,
   wherein each pair of matching pixels is determined by:
      using the block matching algorithm, comparing a block of pixels in the first digital image to a plurality of blocks of pixels in the second digital image, and for each comparison calculating a difference value,
      determining a best matching block of pixels among the plurality of blocks of pixels in the second digital image, wherein the best matching block of pixels is the block of pixels which resulted in the lowest calculated difference value,
      determining the pair of matching pixels as being one pixel from the block of pixels in the first digital image and a corresponding pixel in the best matching block of pixels,
   for each determined pair of matching pixels, calculating a confidence metric, which defines how reliable the matching of the pair of matching pixels is, wherein the confidence metric is calculated at least in part by comparing the lowest calculated difference value with remaining calculated difference values,
   determining the digital image representing the scene, wherein the digital image representing the scene is determined to be one of: the first digital image, the second digital image, and a stereo image comprising the first and the second digital image; and
   encoding the digital image representing the scene by controlling a degree of compression of the digital image representing the scene based on the calculated confidence metrics, and by, for a portion of the digital image representing the scene comprising at least one pixel of a first pair of matching pixels among the pairs of matching pixels:
      comparing the calculated confidence metric of the first pair of matching pixels to a predetermined threshold value,
      upon determining that the calculated confidence metric of the first pair of matching pixels is equal to or above the threshold value, controlling the degree of compression of the portion of the digital image representing the scene using a first compression ratio, and
      upon determining that the calculated confidence metric is below the threshold value, controlling the degree of compression of the portion of the digital image representing the scene using a second compression ratio being higher than the first compression ratio.

2. The method of claim 1, wherein a first and a second pair of matching pixels are determined, wherein the calculating a confidence metric further comprises calculating a first confidence metric defining a matching confidence of the first pair of matching pixels, and a second confidence metric defining a matching confidence of the second pair of matching pixels, wherein the encoding of the digital image representing the scene further comprises:

controlling a degree of compression of a first portion of the digital image representing the scene based on the first confidence metric, and controlling a degree of compression of a second portion the digital image representing the scene based on the second confidence metric.

3. The method of claim 1, wherein at least a third and a fourth pair of matching pixels are determined, wherein the calculating a confidence metric further comprises calculating a third confidence metric defining a matching confidence of the third pair of matching pixels, and a fourth confidence metric defining a matching confidence of the fourth pair of matching pixels, wherein the encoding of the digital image representing the scene further comprises:

controlling a degree of compression of a third portion of the digital image representing the scene based on a combination of the third and the fourth confidence metric.

4. The method of claim 3, wherein an extent of the third portion of the digital image is based on an algorithm for detecting connected regions among the confidence metrics using a threshold value involving positions in the first and/or second image for a pixel in each of the third and fourth pair of matching pixels.

5. The method of claim 4, wherein the encoding the digital image representing the scene further comprises using a codec utilizing blocks of pixels of the digital image, wherein each block has a shape and a size, wherein the extent of the third portion further is based on shape and size of at least one block of pixels which are comprised in the third region.

6. The method of claim 1, wherein the encoding the digital image representing the scene further comprises using a codec utilizing blocks of pixels of the digital image, wherein for each block of pixels in the digital image representing the scene, the encoding the digital image representing the scene further comprises:

controlling a degree of compression of the block of pixels by for each pixel of at least some pixels in the block of pixels, retrieving a confidence metric corresponding to the pixel, and controlling a degree of compression of the block of pixels based on the retrieved confidence metrics of the at least some of the pixels in the block of pixels.

7. The method of claim 6, wherein the controlling the degree of compression of the block of pixels comprises:

comparing each retrieved confidence metric with a threshold value, counting the number of confidence metrics being equal to or above the threshold value, and controlling a degree of compression of the block of pixels based on the count.

8. The method of claim 6, wherein the controlling the degree of compression of the block of pixels comprises:

defining a compression ratio for the block of pixels by calculating one of: a sum, an average value, a maximum value or a median value of the retrieved confidence metrics.

9. The method of claim 1, wherein the block matching algorithm comprises comparing a block of pixels in the first digital image to a plurality of blocks of pixels in the second digital image, and for each comparison calculating a difference value, wherein a confidence metric is calculated by counting a number of difference values that falls below a threshold difference value.

10. A non-transitory computer-readable storage medium including a computer program stored thereon with instructions which when executed by a device having a processor adapt a system to carry out the method of controlling a degree of compression of a digital image representing a scene, said method comprising:

receiving a first digital image and a second digital image representing a first and second view of the scene, respectively, determining a plurality of pairs of matching pixels between the first and second digital images by applying a block matching algorithm on the first and second digital images, wherein each pair of matching pixels is determined by:
using the block matching algorithm, comparing a block of pixels in the first digital image to a plurality of blocks of pixels in the second digital image, and for each comparison calculating a difference value,
determining a best matching block of pixels among the plurality of blocks of pixels in the second digital image, wherein the best matching block of pixels is the block of pixels which resulted in the lowest calculated difference value,
determining the pair of matching pixels as being one pixel from the block of pixels in the first digital image and a corresponding pixel in the best matching block of pixels, for each determined pair of matching pixels, calculating a confidence metric, which defines how reliable the matching of the pair of matching pixels is, wherein the confidence metric is calculated at least in part by comparing the lowest calculated difference value with remaining calculated difference values, determining the digital image representing the scene, wherein the digital image representing the scene is determined to be one of: the first digital image, the second digital image, and a stereo image comprising the first and the second digital image; and encoding the digital image representing the scene by controlling a degree of compression of the digital image representing the scene based on the calculated confidence metrics, and by, for a portion of the digital image representing the scene comprising at least one pixel of a first pair of matching pixels among the pairs of matching pixels:

comparing the calculated confidence metric of the first pair of matching pixels to a predetermined threshold value, upon determining that the calculated confidence metric of the first pair of matching pixels is equal to or above the threshold value, controlling the degree of compression of the portion of the digital image representing the scene using a first compression ratio, and upon determining that the calculated confidence metric is below the threshold value, controlling the degree of compression of the portion of the digital image representing the scene using a second compression ratio being higher than the first compression ratio.

11. The non-transitory computer-readable storage medium of claim 10, wherein a first and a second pair of matching pixels are determined, wherein the calculating confidence metrics further comprises calculating a first confidence metric defining a matching confidence of the first pair of matching pixels, and a second confidence metric defining a matching confidence of the second pair of matching pixels, wherein the encoding of the digital image representing the scene further comprises:

controlling a degree of compression of a first portion of the digital image representing the scene based on the first confidence metric, and controlling a degree of compression of a second portion the digital image representing the scene based on the second confidence metric.

12. The non-transitory computer-readable storage medium of claim 10, wherein at least a third and a fourth pair of matching pixels are determined, wherein the calculating confidence metrics further comprises calculating a third confidence metric defining a matching confidence of the third pair of matching pixels, and a fourth confidence metric defining a matching confidence of the fourth pair of matching pixels, wherein the encoding of the digital image representing the scene further comprises:

controlling a degree of compression of a third portion of the digital image representing the scene based on a combination of the third and the fourth confidence metric.

13. The non-transitory computer-readable storage medium of claim 12, wherein an extent of the third portion of the digital image is based on an algorithm for detecting connected regions among the confidence metrics using a threshold value involving positions in the first and/or second image for a pixel in each of the third and fourth pair of matching pixels.

14. The non-transitory computer-readable storage medium of claim 13, wherein the encoding the digital image representing the scene further comprises using a codec utilizing blocks of pixels of the digital image, wherein each block has a shape and a size, wherein the extent of the third portion further is based on shape and size of at least one block of pixels which are comprised in the third region.

15. The non-transitory computer-readable storage medium of claim 10, wherein the encoding the digital image representing the scene further comprises using a codec utilizing blocks of pixels of the digital image, wherein for each block of pixels in the digital image representing the scene, the encoding the digital image representing the scene further comprises:

controlling a degree of compression of the block of pixels by for each pixel of at least some pixels in the block of pixels, retrieving a confidence metric corresponding to the pixel, and controlling a degree of compression of the block of pixels based on the retrieved confidence metrics of the at least some of the pixels in the block of pixels.

16. The non-transitory computer-readable storage medium of claim 15, wherein the controlling the degree of compression of the block of pixels comprises:

comparing each retrieved confidence metric with a threshold value, counting the number of confidence metrics being equal to or above the threshold value, and controlling a degree of compression of the block of pixels based on the count.

17. The non-transitory computer-readable storage medium claim 15, wherein the controlling the degree of compression of the block of pixels comprises:

defining a compression ratio for the block of pixels by calculating one of: a sum, an average value, a maximum value or a median value of the retrieved confidence metrics.

18. The non-transitory computer-readable storage medium of claim 10, wherein the block matching algorithm comprises comparing a block of pixels in the first digital image to a plurality of blocks of pixels in the second digital image, and for each comparison calculating a difference value, wherein a confidence metric is calculated by counting a number of difference values that falls below a threshold difference value.

19. An encoder for controlling a degree of compression of a digital image representing a scene, the encoder comprising:

a receiving component, including a computer-readable communications medium, arranged to receive a first digital image and a second digital image representing a first and second view of the scene, respectively, a matching component, including a processor, arranged to:

determine a plurality of pairs of matching pixels between the first and second digital images by applying a block matching algorithm on the first and second digital images, wherein each pair of matching pixels is determined by:

using the block matching algorithm, comparing a block of pixels in the first digital image to a plurality of blocks of pixels in the second digital image, and for each comparison calculating a difference value, determining a best matching block of pixels among the plurality of blocks of pixels in the second digital image, wherein the best matching block of pixels is the block of pixels which resulted in the lowest calculated difference value, determining the pair of matching pixels as being one pixel from the block of pixels in the first digital image and a corresponding pixel in the best matching block of pixels, for each determined pair of matching pixels, calculate a confidence metric, which defines how reliable the matching of the pair of matching pixels is, wherein the confidence metric is calculated at least in part by comparing the lowest calculated difference value with remaining calculated difference values, and an encoding component, including the processor and the computer-readable communications medium, arranged to:

determine the digital image representing the scene, wherein the digital image representing the scene is determined to be one of: the first digital image, the second digital image, and a stereo image comprising the first and the second digital image; and encode the digital image representing the scene by controlling a degree of compression of the digital image representing the scene based on the calculated confidence metrics, and by, for a portion of the digital image representing the scene comprising at least one pixel of a first pair of matching pixels among the pairs of matching pixels:

compare the calculated confidence metric of the first pair of matching pixels to a predetermined threshold value, upon determining that the calculated confidence metric of the first pair of matching pixels is equal to or above the threshold value, control the degree of compression of the portion of the digital image representing the scene using a first compression ratio, upon determining that the calculated confidence metric is below the threshold value, control the degree of compression of the portion of the digital image representing the scene using a second compression ratio being higher than the first compression ratio.

20. A stereo camera comprising the encoder of claim 19 and arranged to capture the first digital image and the second digital image representing the first and second view of the scene.

21. The encoder of claim 19, wherein a first and a second pair of matching pixels are determined, wherein the matching component, including the processor, arranged to calculate a confidence metric is further arranged to calculate a first confidence metric defining a matching confidence of the first pair of matching pixels, and a second confidence metric defining a matching confidence of the second pair of matching pixels, and wherein the encoding component, including the processor and the computer-readable communications medium, arranged to encode the digital image representing the scene is further arranged to:

control a degree of compression of a first portion of the digital image representing the scene based on the first confidence metric, and to control a degree of compression of a second portion the digital image representing the scene based on the second confidence metric.

22. The encoder of claim 19, wherein at least a third and a fourth pair of matching pixels are determined, wherein the matching component, including the processor, arranged to calculate a confidence metric is further arranged to calculate a third confidence metric defining a matching confidence of the third pair of matching pixels, and a fourth confidence metric defining a matching confidence of the fourth pair of matching pixels, and wherein the encoding component, including the processor and the computer-readable communications medium, arranged to encode the digital image representing the scene is further arranged to:

control a degree of compression of a third portion of the digital image representing the scene based on a combination of the third and the fourth confidence metric.

23. The encoder of claim 22, wherein an extent of the third portion of the digital image is based on an algorithm for detecting connected regions among the confidence metrics using a threshold value involving positions in the first and/or second image for a pixel in each of the third and fourth pair of matching pixels.

24. The encoder of claim 23, wherein the encoding component, including the processor and the computer-readable communications medium, arranged to encode the digital image representing the scene is further arranged to use a codec utilizing blocks of pixels of the digital image, wherein each block has a shape and a size, wherein the extent of the third portion further is based on shape and size of at least one block of pixels which are comprised in the third region.

25. The encoder of claim 19, wherein the encoding component, including the processor and the computer-readable communications medium, arranged to encode the digital image representing the scene is further arranged to use a codec utilizing blocks of pixels of the digital image, and, for each block of pixels in the digital image representing the scene, is further arranged to:

control a degree of compression of the block of pixels by for each pixel of at least some pixels in the block of pixels, retrieving a confidence metric corresponding to the pixel, and control a degree of compression of the block of pixels based on the retrieved confidence metrics of the at least some of the pixels in the block of pixels.

26. The encoder of claim 25, wherein to control the degree of compression of the block of pixels comprises:

to compare each retrieved confidence metric with a threshold value, counting the number of confidence metrics being equal to or above the threshold value, and to control a degree of compression of the block of pixels based on the count.

27. The encoder of claim 25, wherein to control the degree of compression of the block of pixels comprises:

to define a compression ratio for the block of pixels by calculating one of: a sum, an average value, a maximum value or a median value of the retrieved confidence metrics.

28. The encoder of claim 19, wherein the block matching algorithm comprises comparing a block of pixels in the first digital image to a plurality of blocks of pixels in the second digital image, and for each comparison calculating a difference value, wherein a confidence metric is calculated by counting a number of difference values that falls below a threshold difference value.

\* \* \* \* \*